US008205007B2

United States Patent
Surma et al.

(10) Patent No.: US 8,205,007 B2
(45) Date of Patent: *Jun. 19, 2012

(54) NATIVE FORMAT TUNNELING

(75) Inventors: Peter Surma, Heidelberg (DE); Andreas Dahl, Rauenberg (DE); Stefan Rossmanith, Walldorf (AT); Christoph Hofmann, Wiesloch (DE)

(73) Assignee: SAP AG, Walldorf (DE)

( * ) Notice: Subject to any disclaimer, the term of this patent is extended or adjusted under 35 U.S.C. 154(b) by 45 days.

This patent is subject to a terminal disclaimer.

(21) Appl. No.: 12/725,235

(22) Filed: Mar. 16, 2010

(65) Prior Publication Data

US 2010/0180047 A1 Jul. 15, 2010

Related U.S. Application Data

(63) Continuation of application No. 10/665,979, filed on Sep. 19, 2003, now Pat. No. 7,689,709.

(60) Provisional application No. 60/433,327, filed on Dec. 13, 2002.

(51) Int. Cl.
G06F 15/16 (2006.01)
(52) U.S. Cl. ........................................ 709/236; 709/246
(58) Field of Classification Search .................. 709/236, 709/246
See application file for complete search history.

(56) References Cited

U.S. PATENT DOCUMENTS

| 6,102,969 | A  * | 8/2000  | Christianson et al. ........ 717/146 |
| 6,442,749 | B1 * | 8/2002  | Hirao et al. .................... 717/170 |
| 6,697,878 | B1 * | 2/2004  | Imai .............................. 719/316 |
| 6,721,777 | B1 * | 4/2004  | Sharma .......................... 718/101 |
| 6,724,996 | B1 * | 4/2004  | Ballintine et al. .............. 398/98 |
| 6,792,576 | B1 * | 9/2004  | Chidlovskii ................... 715/215 |
| 6,820,135 | B1 * | 11/2004 | Dingman et al. ............. 709/246 |
| 6,851,089 | B1 * | 2/2005  | Erickson et al. .............. 715/255 |
| 6,940,870 | B2 * | 9/2005  | Hamlin ......................... 370/466 |
| 6,970,935 | B1 * | 11/2005 | Maes ............................. 709/230 |
| 7,013,290 | B2 * | 3/2006  | Ananian .................... 705/26.42 |
| 7,028,252 | B1 * | 4/2006  | Baru et al. ..................... 715/273 |
| 7,043,532 | B1 * | 5/2006  | Humpleman et al. ........ 709/208 |
| 7,581,170 | B2 * | 8/2009  | Baumgartner et al. ....... 715/234 |
| 2001/0039540 | A1 * | 11/2001 | Hofmann et al. ................. 707/3 |
| 2002/0099735 | A1 * | 7/2002  | Schroeder et al. ............ 707/513 |
| 2002/0152210 | A1 * | 10/2002 | Johnson et al. ................... 707/9 |
| 2002/0161801 | A1 * | 10/2002 | Hind et al. ..................... 707/513 |
| 2003/0004774 | A1 * | 1/2003  | Greene et al. ..................... 705/8 |
| 2003/0014500 | A1 * | 1/2003  | Schleiss et al. ............... 709/218 |
| 2003/0058277 | A1 * | 3/2003  | Bowman-Amuah .......... 345/765 |
| 2003/0074463 | A1 * | 4/2003  | Swartz et al. ................. 709/230 |
| 2003/0093471 | A1 * | 5/2003  | Upton ........................... 709/203 |
| 2003/0182452 | A1 * | 9/2003  | Upton ........................... 709/246 |
| 2004/0205580 | A1 * | 10/2004 | De Angelis et al. .......... 715/513 |
| 2005/0005116 | A1 * | 1/2005  | Kasi et al. ..................... 713/170 |

* cited by examiner

Primary Examiner — Hieu Hoang
(74) Attorney, Agent, or Firm — Mintz, Levin, Cohn, Ferris, Glovsky and Popeo, P.C.

(57) ABSTRACT

Systems and techniques are disclosed for transmitting a message through an application integration system without having to convert the message from a format that native to both a sending application and a receiving application. A computer-implemented method for transmitting a message from a sending application through an application integration system can include determining a receiving application of the message, and determining a file format used by the receiving application. If the file format used by the receiving application is substantially identical to a file format used by the sending application, the method can include wrapping the message in a markup language file envelope according to a markup language used by the application integration system. The message can then be routed in the markup language file envelope to the receiving application.

17 Claims, 6 Drawing Sheets

NATIVE FORMAT TUNNELING

CROSS-REFERENCE TO RELATED APPLICATIONS

This application claims priority to U.S. Provisional Patent Application No. 60/433,327, filed on Dec. 13, 2002 and entitled, "Exchange Infrastructure for Collaborative Business Systems," and is a continuation of U.S. patent application Ser. No. 10/665,979, filed on Sep. 19, 2003 now U.S. Pat. No. 7,689,709 and entitled, "Native Format Tunneling," both of which are incorporated by reference herein in their entireties.

BACKGROUND

The following description relates to an exchange infrastructure for collaborative business systems.

Companies face an increasing need for integration of and collaboration among their information and enterprise software systems. In most current system landscapes, many components are directly connected in a one-to-one relationship with other components, with the integration capabilities hardwired into the application components and individual mappings programs. Under these conditions, collaborative sharing of information or process control tends to be difficult if not impossible. Upgrades, changes, or extensions to an infrastructure of directly connected components are challenging and resource-intensive.

Electronic business collaboration, however, increasingly requires connectivity among all applications inside and outside of company boundaries. Networks such as the Internet provide opportunities for systems to communicate almost quickly and easily with other systems or individuals. Business processes that once were restricted to intranets and their users are now moving to the Internet to become an effective composition of Web services. A Web service is a programmable, self-contained, self-describing, modular application function that can be published, discovered or invoked through an open Internet standard.

While technical connectivity can be achieved using new open protocols and standards like the hypertext transfer protocol (HTTP) and extensible markup language (XML), the challenge of mapping different business semantics remains. To capture future rounds of efficiency gains, enterprises increasingly will be required to deploy a new breed of collaborative business processes that cross enterprises or functions within an enterprise. In addition, enterprises will increasingly need to process real-dme scenarios instead of performing batch processing. These collaborative processes will have significantly more sophisticated integration requirements than traditional processes.

One solution for technical connectivity includes receiving a message from a sender in the sender's native file format, converting the message to XML for integration processing and routing, and re-converting the XML message to a receiver's native format. Each process of converting the message includes identifying a recipient or group of recipients, determining a routing of the message to the recipient(s), and mapping the message to a new format.

SUMMARY

An application integration system communicates messages between applications in a heterogeneous network. One embodiment includes a computer-implemented method for transmitting electronic messages through the application integration system in a manner that preserves a message format native to both a sending application and at least one receiving application. The method includes receiving a message from the sending application, in which the message has a message format used by the sending application. The method further includes wrapping the message in a markup language file envelope, and routing the markup language file envelope with the message through the application integration system. The method further includes unwrapping the message from the markup language file envelope, and transmitting the message according to the message format to the receiving application.

In another embodiment, a computer-implemented method for transmitting a message from a sending application through an application integration system includes determining a receiving application of the message, and determining a file format used by that receiving application. If the file format used by the receiving application is substantially identical to a file format used by the sending application, the technique includes wrapping the message in a markup language file envelope, and then routing the markup language file envelope with the message to the receiving application.

In yet another embodiment, a system for communicating a message file from a sending application in a heterogeneous application network includes an application integration system. The application integration system is in communication with the sending application and one or more receiving applications. The application integration system includes an inbound adapter connected with the sending application. The inbound adapter includes logic that is configured to determine at least one receiving application for receiving the message, determine a file format used by the receiving application, and if the file format used by the receiving application is substantially identical to a file format used by the sending application, wrap the message in a markup language file envelope according to a markup language format used by the application integration system.

Details of one or more implementations are set forth in the accompanying drawings and the description below. Other features and advantages may be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION

The systems and techniques described here relate to enterprise application integration. In various embodiments, the systems and techniques specifically relate to enabling a message exchange between applications using the same file format, without the need to convert a message from its native format to an intermediate format corresponding to an application integration system, and back again. In effect, the systems and methods provide for "tunneling" a message in its native format through the application integration system, by wrapping the message in an open standard file format envelope supported by the application integration system.

Figure 1:
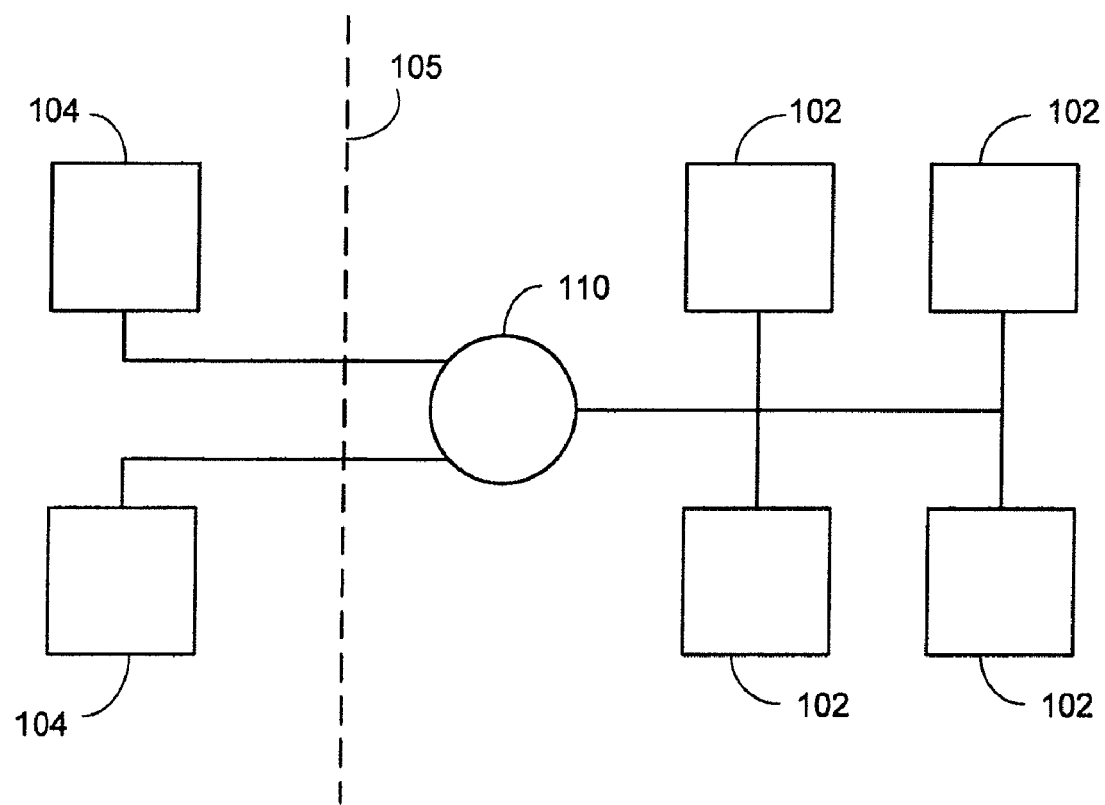
FIG. 1 is a simplified block diagram of an exchange system for integrated, message-based collaboration.

FIG. 1 is a simplified block diagram of a business application integration system 100 for integration and "loose coupling" (i.e. message-based interaction) of applications. Each of the applications may employ proprietary file formats for communicating messages, however two or more of the applications in an application network may employ the same file format. The system 100 includes an exchange infrastructure (XI) 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates via messaging with one or more other components according to at least one of a number of communication protocols or standards.

The XI 110 is a self-contained, modularized exchange platform for driving collaboration among the components 102, 104. The XI 110 includes a central integration repository and directory storing shared collaboration knowledge. The XI 110 supports open standards such as various standard markup languages like the extensible markup language (XML), web service description language (WSDL), and simple object access protocol (SOAP) to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered, and accessed within a network of components 102, 104 using open standards.

The XI 110 includes mechanisms for transforming messages of a native format from a sender system into an open standard such as XML for integration processing, and if necessary transforming an XML message to the same or different native format of a receiver system. However, another general mechanism of the XI 110 is to tunnel data formats that are either commonly or distinctly native to components 102 and 104 through an integration infrastructure without an explicit conversion to XML or other standard format supported by the XI 110. Such "native format tunneling" economizes processing resources and increases throughput of communications between components.

Figure 2:
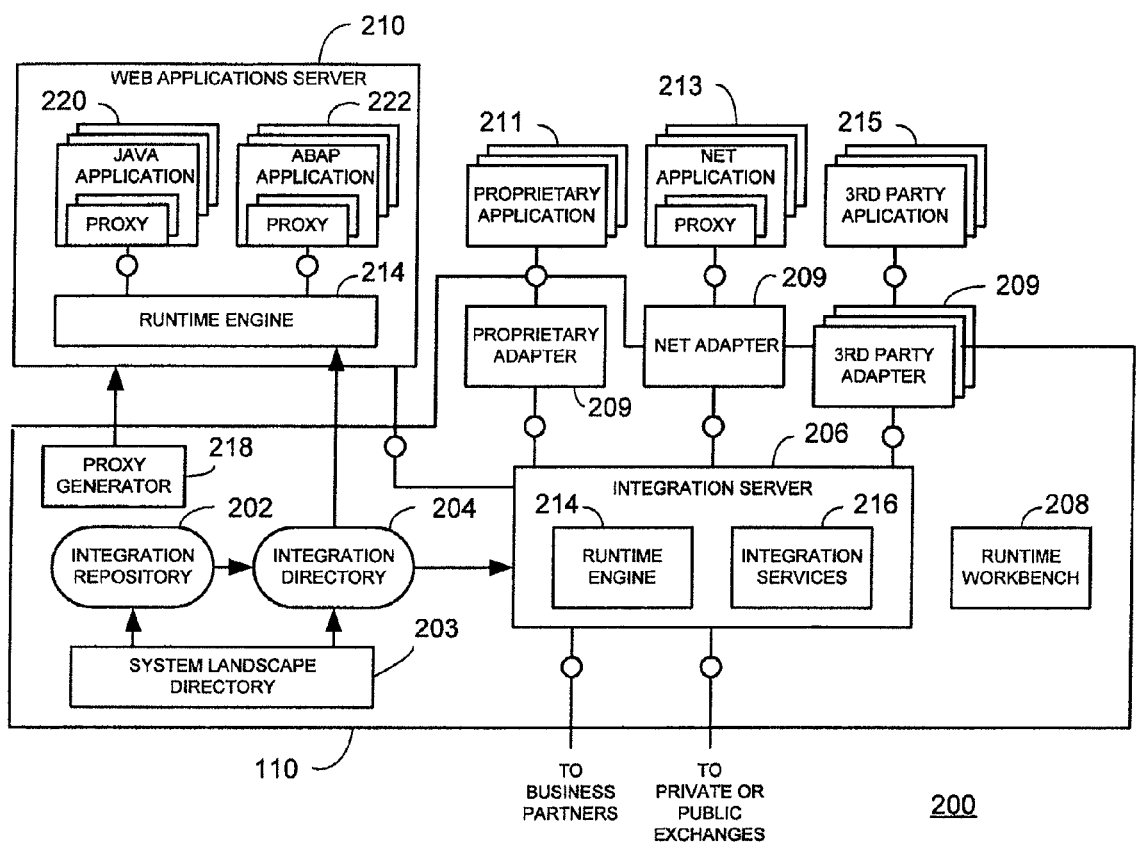
FIG. 2 is a block diagram of an exchange infrastructure.

FIG. 2 illustrates a system landscape 200 including an XI 110 for facilitating message-based collaboration among applications. The exchange infrastructure 110 includes an integration repository 202, an integration directory 204, a system landscape directory 203, and an integration server 206. The integration repository 202 captures design-time collaboration descriptions of all software components that can communicate via the XI 110. The integration directory 204 captures configuration-specific collaboration descriptions of the system landscape 200 at runtime, which includes accessing actual component installations from the system landscape directory 203 and connectivity descriptions for external components, all of which represents the shared business semantics of the system landscape 200. The integration server 206 uses the shared business semantics at runtime to execute message-based collaboration among the active software components.

The integration server 206 includes a runtime engine 214 that provides messaging and business process control at runtime for connecting services and managing the process flow of value chains. The integration server 206 also includes integration services 216 that typically require an application-specific implementation, such as analytics and master data services, for example. Like the integration repository 202 and integration directory 204, the integration server 206 is configured for deployment within any existing system infrastructure. The integration server 206 is preferably a dedicated server that applies the shared collaboration knowledge of the integration directory 204 of the supported system landscape in a runtime collaboration environment. A runtime workbench 208 allows organizations or users to manage the reliable operation of the XI 110.

The XI 110 also includes various adapters 209 that provide connectivity between the integration server 206 and proprietary applications 211, Web-based services 213, and third party applications 215. The XI 110 can also include Web applications server 210 that provides Web-based applications programmed according to standard computing platforms using web-specific programming languages such as Java and ABAP, for instance. The Web application server 210 also includes an instance of the runtime engine 214 for providing messaging and business process control between Web-based applications such as Java applications 220 and ABAP applications 222, and other components.

Communication or calls to external software components can be enabled by using a proxy which allows the interface for the software component to be implemented locally in the XI 110. Proxies make the communication technology stack transparent to applications, and present an application with a programming language-dependent interface. The proxies can be generated by a proxy generator 218 based on information stored on the integration repository 202. The proxy generator 218 uses the interface information described via a standard Web-based language such as WSDL and XSDL to create platform- and programming language-dependent code in the application development system. The communication logic can be implemented within the proxy that represents the interface description of the respective development platform, such as Java, ABAP, and .NET for the web-based applications 213. The proxies convert platform-specific data types into XML and provide access to the component-specific local integration engine. On the outbound side, proxies are generated completely. Outbound proxies can be called via a service invocation provided by an application's developer. On the inbound side, only proxy skeletons need to be generated which must be further implemented by the receiving application.

Figure 3:
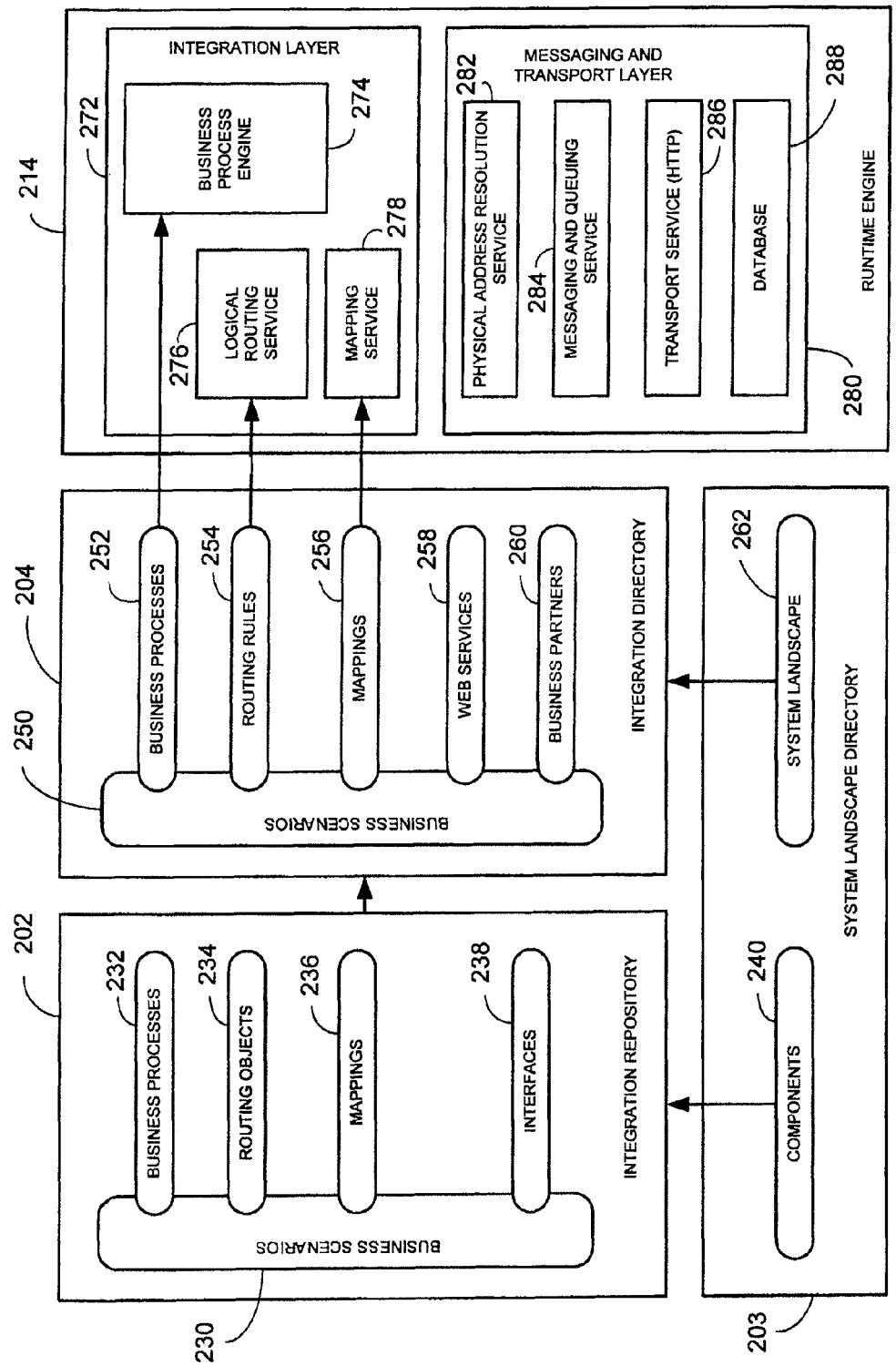
FIG. 3 is a detailed block diagram of an integration repository, integration directory, and runtime engine for collaborative processing.

FIG. 3 illustrates the integration repository 202, the system landscape directory 203, the integration directory 204 and an instantiation of the runtime engine 214 in greater detail. The integration repository 202 includes design-time business processes 232, routing objects 234, mappings 236, and interfaces 238, all of which are defined according to one or more business scenarios 230. The integration repository 202 accesses descriptions of all software components 240 in the system landscape from the system landscape directory 203. The business scenarios 230 of the integration repository 202 describe and configure message-based interaction between application components or enterprises. An enterprise can select one or more business scenarios described in the integration repository 202 as a best practice for rapid configuration of the XI 110.

The business processes 232 can be implemented as extensible compound Web services executed using a business process engine 274. Each business process 232 is modeled centrally in the integration repository 202, and can be defined to the detail of user interaction steps. A company or user designs each business process 232 according to its business needs, independently of the technical implementation. There may be several categories of business process templates: i.e. generic business processes, industry-specific processes, and company-specific processes, for example. Each process identifies the Web services that are needed and that must be interconnected. In one specific implementation, business processes 232 are defined using a graphical interface, and then stored in a standardized format like Business Process Modeling Language (BPML). The business process engine can then interpret these models and execute them to drive collaboration among software components.

Routing objects 234 are pointers that point to a specific part of a message. They are predefined criteria to determine potential receivers of messages that must be distributed between components and business partners during collaborative processing. Information about the routing objects is used for receiver determination. Mappings 236 define required transformations between message interfaces 238, message types, or data types in the integration repository 202. These transformations cover structural conversions and value mappings. Structural conversions are used for semantically equivalent types that are syntactically or structurally different, whereas value mapping may be used when an object is identified by different keys in multiple systems. In a specific implementation, a graphical mapping tool is provided to assist in mapping, and transforming data is based on the Extensible Stylesheet Language Transformation (XSLT) or Java code.

The integration repository 202 is the central point of entry for interface development, storage and retrieval, and includes interfaces 238 that describe all message interfaces of all software components in the system landscape. Accordingly, the interfaces 238 can be implemented on any software component using any technology. In one implementation, the interfaces 238 are based on WSDL. Message interfaces are made up of message types, which are in turn made up of data types. The data types can be described using XML Schema Definition Language (XSDL). An example of a data type is "address," which is used in the message type "Create PO" and can be reused for the message type "Create Invoice." Interfaces 238 can be arranged according to any classification, such as inbound and outbound, or synchronous and asynchronous.

The components 240 represent component descriptions that include information about application components, as well as information relating to their dependencies on each other. In a specific implementation, the component descriptions are based on the standard Common Information Model (CIM) of the Distributed Management Taskforce. Since the integration repository 202 includes design-time information, it uses only component-type information, independent of actual installation, is stored as components 240 in the system landscape directory 203. The component descriptions can be added using an API or interactively using a graphical user interface.

The integration directory 204 details information from the integration repository 202 that is specific to the configuration of each component as installed in the system. The configuration-specific collaboration descriptions of the integration directory 204 can be generated automatically from content in the integration repository 202 or manually by a user using a graphical user interface. In one implementation, the integration directory 204 is built on a Java platform and its content is represented via XML using open Internet standards. The integration repository 202 can be upgraded without affecting the integration directory 204 or any runtime collaborative processes. The user then decides which changes should be transferred to the integration directory 204, either as predetermined automatic upgrades or manually via graphical tools.

The integration directory 204 includes configuration-specific descriptions of business scenarios 250, business processes 252, routing rules 254, and executable mappings 256. The integration directory 204 also includes descriptions of active Web services 258, and active business partners 260. The integration directory 204 uses a description of the active system landscape 262 from the system landscape directory 203. The business scenarios 250 in the integration directory 204 represent the overall view of the interaction among interfaces and mappings 256 in the context of the actual configuration relevant for the specific implementation. The business processes 252 represents an executable description of all active business processes.

The routing rules 254 determine the receivers of a message on a business level. In one specific implementation, the content of a message is used as a routing rule 254. Other parameters may also be used. Relevant input parameters include the sender, the sender message type, the message to identify the receivers, and the receiver message type. The routing rules 254 can be described declaratively using XML Path Language (Xpath, i.e. by using a graphical tool) or can be coded in Java or use routing objects 234. The integration engine 214 at runtime accesses information on the routing rules 254.

The routing rules 254 may use logical terms to describe senders and receivers in order to separate them from the physical address provided by the Web services 258 described in the integration directory 204. The physical address can therefore be changed without changing business-oriented content. Mappings 256 in the integration directory 204 represent mappings required in the active system landscape, in contrast to the integration repository mappings 236 that contains all supported mappings. Some new entries however, such as a new sequence of mappings, can be made only in the integration directory 204 to address additional Web services for mapping, for example. The integration engine 214 accesses the integration directory mappings 256 at runtime.

Web services 258 describe interfaces implemented within the current active system landscape, as well as active Web services supported by described business partners 260. As such, information describing Web services 258 can be exchanged with UDDI-compatible directories or added manually. Each Web service 258 description also provides physical addressing details, access information, and other special attributes such as uniform resource locator (URL), protocol, and security information. In one implementation, the Web services 258 are described in WSDL, and SOAP and ebXML are used as messaging protocols. The integration engine 214 accesses information about the Web services 258 at runtime as well.

The system landscape 262 of the system landscape directory 203 describes the current system landscape that uses the XI 110. The system landscape 262 describes which components are installed and available on certain machines within the system, which instance or client was chosen, further information on the installed components, other system landscapes, and so on. The system landscape 262 description is based on an open architecture and can adhere to any widely accepted standard such as CIM. Thus, many proprietary and third party components can be configured to automatically register themselves in the system landscape 262 upon being installed within the actual system landscape. Access interfaces to the system landscape 262 description can be based on open standards as well, such as the Web-based Enterprise Management (WBEM) and SOAP standards.

Business partners 260 defines information for business partners of an enterprise, such as names, addresses, and URLs, but may also contain more detailed and sophisticated information. For instance, the business partners 260 may include a description of the message formats that can be directly received and processed, or of security protocols used for safe communications, or trading terms that are employed in the partnership. The kind of information stored in business partners 260 can be governed by enterprise-specific decisions of the enterprise using the XI 110.

The integration directory 204 and the runtime engine 214 form a collaborative runtime environment for executing collaborative business processes. The collaborative runtime environment provides all runtime components relevant for exchanging messages among the connected software components and business partners. The integration server 206 executes within the collaborative runtime environment or within Web application server 210, either of which can include an instance of the runtime engine 214.

The runtime engine 214, which exchanges all messages between the various interconnected components, includes two layers: an integration layer 272 and a messaging and transport layer (MTL) 280. The integration layer 272 includes a business process engine 274 executing centrally modeled business processes, a logical routing service 276 and a mapping service 278. The MTL 280 provides a physical address resolution service 282, a messaging and queuing service 284, a transport service 286 via HTTP, and a database 288. The integration services 216 in the integration server 206 can support the runtime engine 214. An MTL 280 is also included in each instantiation of the runtime engine 214 in Web applications servers 210, as well as in each adapter 209 of the adapter framework connecting to various software components. Each MTL 280 has a role in the execution of the EO protocol, as will be explained further below.

At runtime, business processes 252 are instantiated and executed by the business process engine 274, which executes the respective Web services described in Web services 258 independent of their location according to the business process model. The business process engine 274 is independent of the semantics of the executed business processes 252, and is configured as a mediator and facilitator for business processes 252 to interact with technical components of the runtime system landscape.

Figure 4:
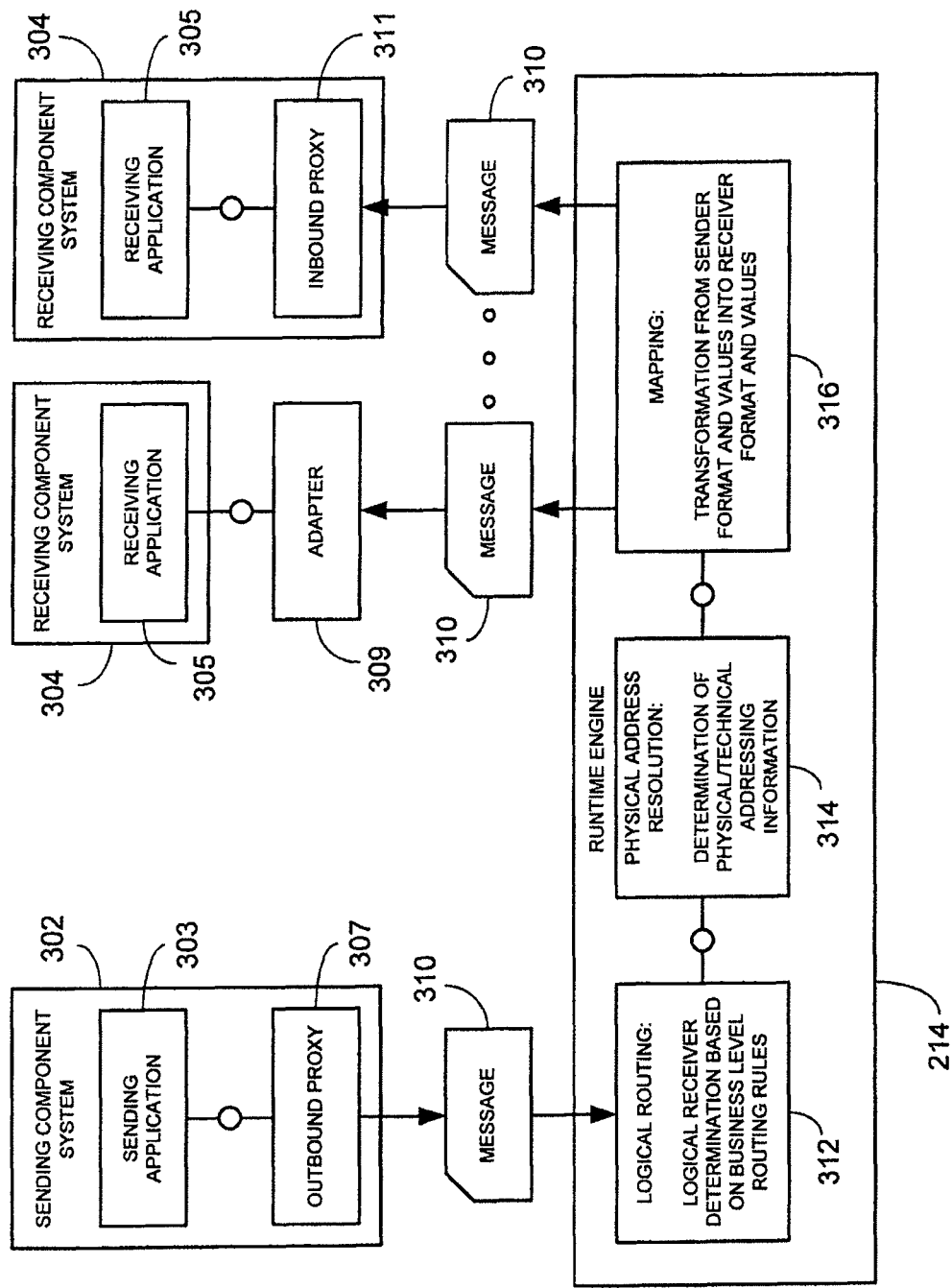
FIG. 4 is a block diagram of system for transmitting a message using a runtime engine of the exchange infrastructure.

FIG. 4 is a block diagram illustrating several functions of the runtime engine 214 in a process of exchanging a message between applications. A sending application 303 resides in a sending component system 302, which represents the hardware and software platform of the sending application 303. One or more receiving applications 305 each reside in a receiving component system 304. A communication path for a message 310 can include an outbound proxy 307 at the outbound interface from the sending component system 302, through the runtime engine 214 and adapter 309 to the receiving component system 304. A receiving component system 304 may also utilize an inbound proxy 311 rather than an adapter. The configuration and connectivity of the shown receiving component systems 304 is merely exemplary, and it should be noted that such configuration and connectivity could take any number of forms. The pictured example illustrates both asynchronous and synchronous communication. In synchronous communication, routing and physical address resolution is only needed for the request as the response is transferred to the sender directly over the same channel used by the request message.

With reference also to FIGS. 2 and 3, for a given message the logical routing service 276 uses information on the sending application and the message interface to determine receivers and required interfaces by evaluating the corresponding routing rules, as shown at 312. The routing rules are part of the configuration-specific descriptions of the runtime system landscape provided by the integration directory 204, and can be implemented as Xpath expressions or Java code. The mapping service 316 determines the required transformations that depend on message, sender, and sender interface, as well as on the receiver and receiver interface at 314.

After retrieving the required mapping from the integration directory 204, the mapping service 278 can either execute XSLT mappings or Java code (or any combination in a given sequence) to the content of the sent message. Below the integration layer, the messaging and queuing services 284 move the message to the intended or required receiver(s). After the message is transformed into the format expected by each receiver, the physical address of the required receiver service and other relevant attributes are retrieved from the integration directory 204 at 314, and mapped to the message at 316.

A queuing engine in the messaging and queuing service 284 stores ingoing, outgoing, erroneous, and work-in-progress messages persistently. The messaging layer of the runtime engine 214 provides queuing functions for the physical decoupling of application components and guarantees messages are delivered exactly once according to a protocol (i.e. the "EO protocol"). The transport service 286 enables the runtime engine 214 to act as both an HTTP client and server. The transport service 286 implements an HTTP client that enables outbound communication and an HTTP server that handles inbound communication by accepting incoming documents. Additional server functions can address situations in which the receiver has no HTTP server by supporting polling over HTTP.

As discussed above, the application integration system 100 and the XI 110 may utilize any of a number of open standard file formats, e.g., XML. Data from a sending application 303 may be mapped to the XML format, and converted from their original format to XML by an outbound adapter prior to entering the XI 110. The message may then be mapped and converted to another format associated with the receiving application 305 by an inbound adapter 309. However, mapping and converting to and from the central XI format may consume large amounts of processing time and other resources.

Figure 5:
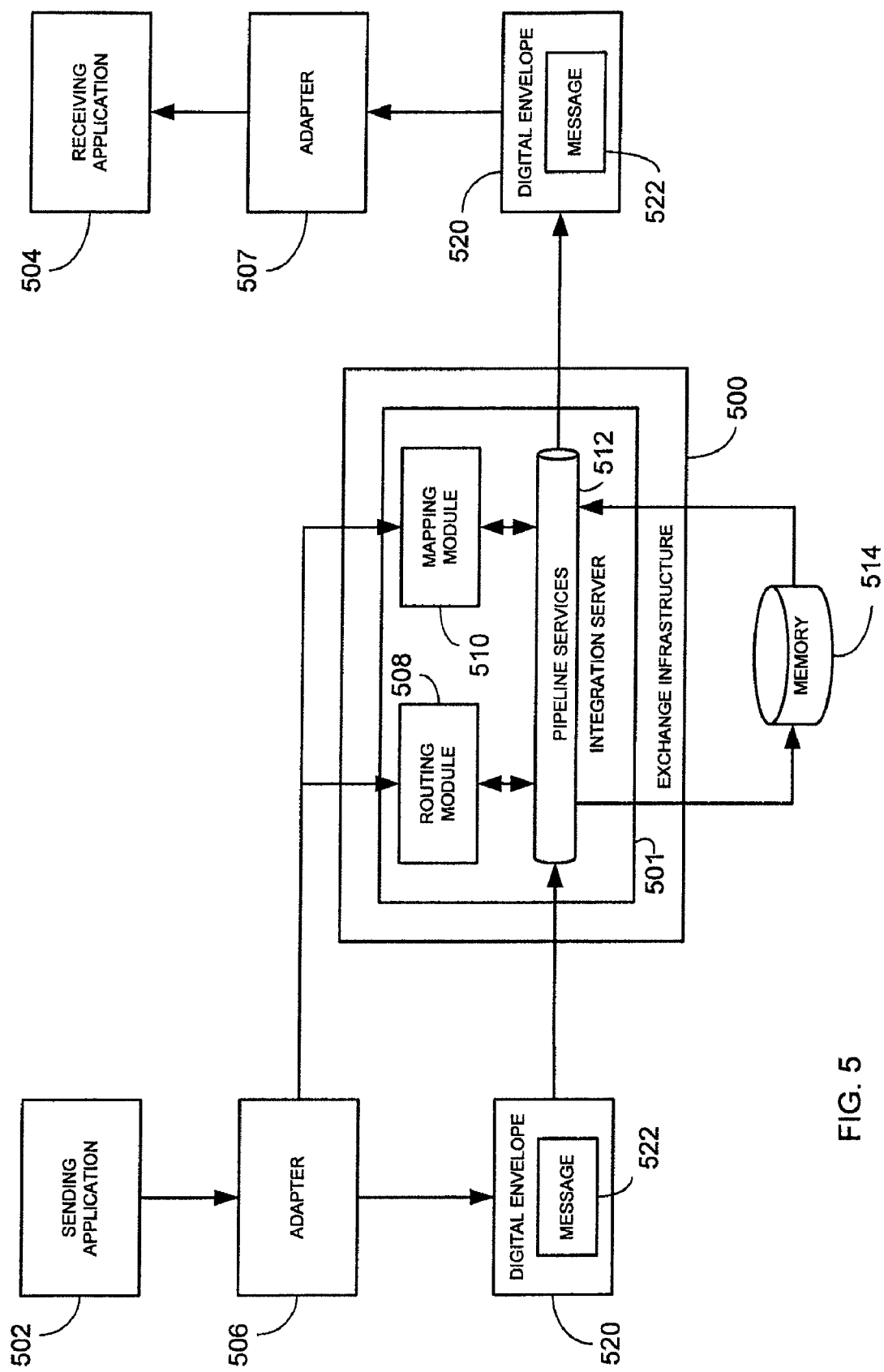
FIG. 5 is a block diagram of an exchange infrastructure having a common persistence layer.

FIG. 5 is a block diagram illustrating a native format tunneling technique for a case in which both a sending application 502 and a receiving application 504 each employ a file format that is native to both applications 502 and 504 but different from a format used by the XI 500. For example, both applications may utilize what is known as an "Idoc file format," a proprietary file format that is widely deployed in systems from SAP of Germany, while the XI 500 supports an open standard such as XML.

In an embodiment, an adapter 506 at the sender side may poll both a routing module 608 and a mapping module 610 to determine the receiving application 504 as well as the file format used by the receiving application 504. If the receiving application 504 uses the same file format as the sending application 502, the adapter 506 can wrap a message 522 being transmitted in an markup language file envelope 520, and send the message 522 to the integration server 501 of the XI 500 without mapping and converting the message to a file according to the markup language or other open standard file format. In one example, the adapter 506 serializes one or more data objects of the message into one object group, which is then wrapped in an XML envelope. An adapter 507 at the receiver side can extract or "unwrap" the message 522 from the envelope 520 and pass the message in substantially its original format to the receiving application 504 for processing.

In one example, the adapter 506 is an Idoc adapter. If the receiving application 504 also utilizes the Idoc format, the Idoc adapter will wrap an Idoc document in an XML envelope and send the message through the XI without mapping the Idoc document to the XML format. For an XI operation using the Idoc format, an Idoc document may be delivered to an Idoc adapter as two tables: a control table, and a data table that includes the payload. The control table is converted into an intermediate format in XML, which is later, by an inbound technical mapping, converted into the format of the normal XI message header used for logical routing. The Idoc adapter can convert the data table into XML early at the inbound side. The routing module 508 and mapping module 510 are then free to access the XML message for read and write access as required.

In the example however, when both the sender and receiver use the Idoc format, the Idoc adapter does not convert the data table into XML. Instead, XML conversions will occur "late," that is, only if a pipeline service 512 requests the payload in the XML format. Because of this implicit conversion, the routing and mapping modules 508 and 510 are still free to access the XML message for read and write access as usual.

In order to optimize runtime, several objects, or representations of the message 522, may be stored simultaneously in a memory 514 such as a database. For example, when the Idoc internal tables have been converted into XML, it may be desirable to retain both the internal tables and the XML version of the payload in memory, at least as long as neither of these has been changed by a pipeline service. As a result, back-conversions can be avoided when the initial object is requested again. However, if the payload is large, these runtime optimizations may be limited by the excessive memory consumption of holding several representations of the same data.

Because of the trade-offs outlined above, the following rules can be followed for specific cases in which the optimization is performed. First, to avoid data inconsistencies, objects should be cleared from memory as soon as one of the parallel objects is changed. In addition, several representations of the same data should be held in parallel objects in order to avoid unnecessary conversions (i.e., runtime optimization). Objects should be freed as soon as possible to minimize memory consumption (i.e., memory optimization). Also, the size of data should be kept to a minimum to minimize database access times. This may be done using compression techniques and/or storing only one of the parallel objects if possible.

One way to avoid complex decisions based on these rules at runtime is to define a critical payload size, and then use runtime optimization for payloads below the critical payload size and use memory optimization for payloads above the critical payload size. A look-ahead technique may be employed in which, at an earlier step of the pipeline processing, e.g., mapping, it is determined whether conversion is necessary. If conversion is not necessary, the parallel object may be discarded immediately. Also, payload access may be optimized by not instantiating a payload from the persistent database unless it is accessed.

Figure 6:
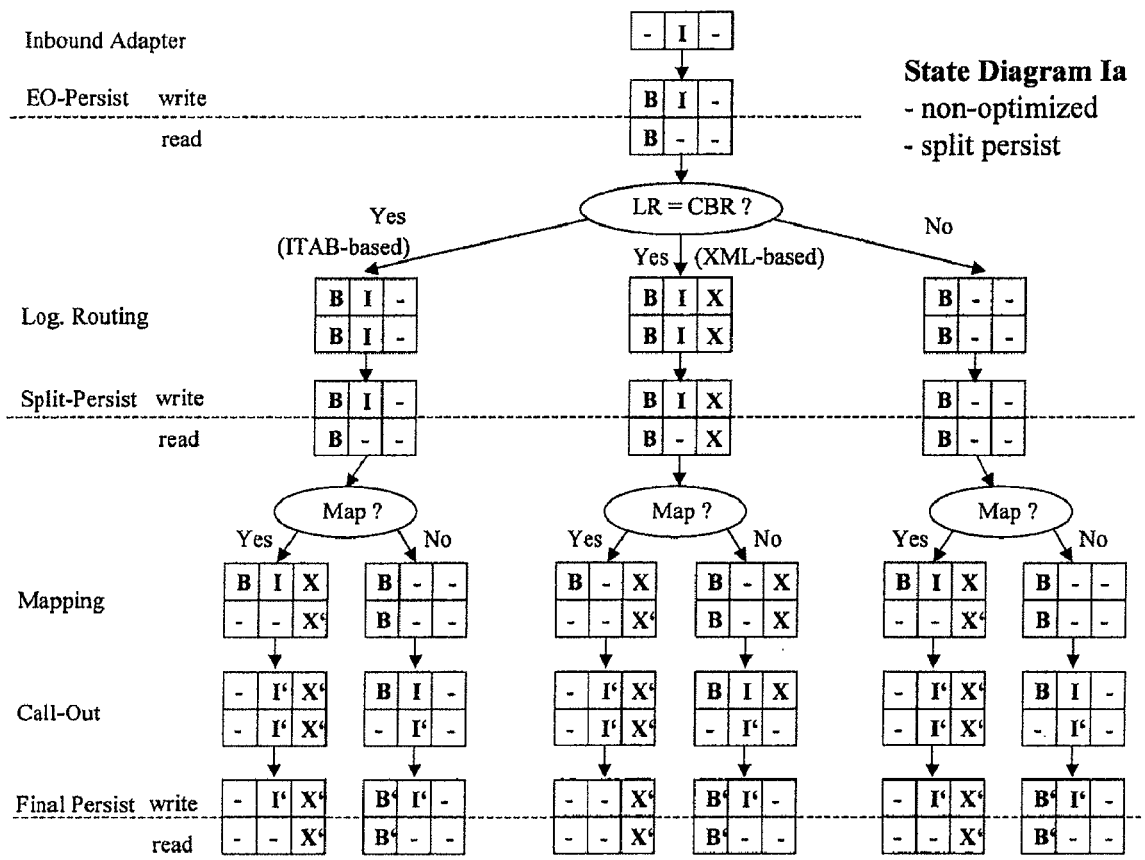
FIG. 6 is a state transition diagram of messages that travel through the common persistence layer.

FIG. 6 illustrates a state transition diagram 600 showing the state of three parallel objects: binary stream ("B"), internal table ("I") and XML ("X") at each position during processing through the pipeline. The term binary stream refers to the streamed form of the data table which is generated when the data table is stored in a central XI persistence layer, such as a database.

The state transition diagram shows the possible processing modules during the lifetime of the message 522 (from FIG. 5) from the top to the bottom of the diagram. Depending on the configuration of the system, several decisions can be made, as shown from left to right. Each node includes two situations: before processing and after processing. At the top of each node, before processing is illustrated. Accordingly the bottom of the node shows the situation after processing.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a backend component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such backend, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Other embodiments may be within the scope of the following claims.

What is claimed:

1. A method comprising:

receiving at an exchange infrastructure providing collaborative processing among internal components and external components of an enterprise that is implemented on one or more processors a poll from a first application using a first file format to determine, by an application integration system, an identity of a second application and that the second application uses the first file format, the application integration system comprising a routing module and a mapping module, the routing module determining the identity of the second application, the mapping module determining an application format used by the second application, the first file format differing from and being incompatible with an open standard language supported by the exchange infrastructure;

transmitting, by the exchange infrastructure, data to the first application indicating the identity of the second application and that the second application uses the first file format;

receiving, at the exchange infrastructure, a message from the first application;

generating, at the exchange infrastructure upon determining that the second application uses the first file format, a markup language file envelope comprising content of the message unchanged and a header in the open standard language, the header comprising routing information for the message, the content remaining in the first file format without being converted or mapped to the open standard language;

routing the markup language file envelope through the exchange infrastructure via one or more pipeline services for delivery to the second application; and wherein the open standard language is one of extensible markup language (XML), Simple Object Access Protocol (SOAP), or Web Services Description Language (WSDL).

2. The method of claim 1, further comprising: receiving the message at the exchange infrastructure from the first application, which is implemented on other one or more processors than the exchange infrastructure.

3. The method of claim 1, further comprising: determining, by the exchange infrastructure, the first file format.

4. The method of claim 1, further comprising:

determining, at the exchange infrastructure, that a second message received by the exchange infrastructure from a third application that uses a third file format is to be routed between the third application and a fourth application that uses a fourth file format that differs from and is incompatible with the third file format, one or both of the third file format and the fourth file format differing from and being incompatible with the open standard language; and converting, at the exchange infrastructure, the second message into a converted second message in the open standard language; and routing the converted second message through the exchange infrastructure for delivery to the fourth application.

5. The method of claim 4, further comprising: converting the converted second message from the open standard language to the fourth file format at the exchange infrastructure.

6. The method of claim 1, wherein the first provider comprises an external software component that communicates with the exchange infrastructure over a network and the first file format comprises a proprietary file format, the method further comprising generating a proxy by the exchange infrastructure to implement an interface for the external software component locally within the exchange infrastructure using the open standard language.

7. An article of manufacture comprising a non-transitory computer readable storage medium storing instructions that, when implemented by one or more processors, cause the one or more processors to perform operations comprising:

receiving at an exchange infrastructure providing collaborative processing among internal components and external components of an enterprise that is implemented on one or more processors a poll from a first application using a first file format to determine, by an application integration system, an identity of a second application and that the second application uses the first file format, the application integration system comprising a routing module and a mapping module, the routing module determining the identity of the second application, the mapping module determining an application format used by the second application, the first file format differing from and being incompatible with an open standard language supported by the exchange infrastructure;

transmitting, by the exchange infrastructure, data to the first application indicating the identity of the second application and that the second application uses the first file format;

receiving, at the exchange infrastructure, a message from the first application;

generating, at the exchange infrastructure upon determining that the second application uses the first file format, a markup language file envelope comprising the content of message unchanged and a header in the open standard language, the header comprising routing information for the message, the content remaining in the first file format without being converted or mapped to the open standard language;

routing the markup language file envelope through the exchange infrastructure via one or more pipeline services for delivery to the second application; and wherein the open standard language is one of extensible markup language (XML), Simple Object Access Protocol (SOAP), or Web Services Description Language (WSDL).

8. The article of claim 7, wherein the operations further comprise: receiving the message at the exchange infrastructure from the first application, which is implemented on other one or more processors than the exchange infrastructure.

9. The article of claim 7, wherein the operations further comprise: determining, by the exchange infrastructure, the first file format.

10. The article of claim 7, wherein the operations further comprise:

determining, at the exchange infrastructure, that a second message received by the exchange infrastructure from a third application that uses a third file format is to be routed between the third application and a fourth application that uses a fourth file format that differs from and is incompatible with the third file format, one or both of the third file format and the fourth file format differing from and being incompatible with the open standard language; and converting, at the exchange infrastructure, the second message into a converted second message in the open standard language; and routing the converted second message through the exchange infrastructure for delivery to the fourth application.

11. The article of claim 10, wherein the operations further comprise: converting the converted second message from the open standard language to the fourth file format at the exchange infrastructure.

12. The article of claim 7, wherein the first provider comprises an external software component that communicates with the exchange infrastructure over a network and the first file format comprises a proprietary file format, the method further comprising generating a proxy by the exchange infrastructure to implement an interface for the external software component locally within the exchange infrastructure using the open standard language.

13. A system comprising:
   one or more processors; and
   memory coupled to the at least one or more processors storing instructions that, when implemented by the one or more processors, cause the one or more processors to perform operations comprising:
   receiving at an exchange infrastructure providing collaborative processing among internal components and external components of an enterprise that is implemented on one or more processors a poll from a first application using a first file format to determine, by an application integration system, an identity of a second application and that the second application uses the first file format, the application integration system comprising a routing module and a mapping module, the routing module determining the identity of the second application, the mapping module determining an application format used by the second application, the first file format differing from and being incompatible with an open standard language supported by the exchange infrastructure;
   transmitting, by the exchange infrastructure, data to the first application indicating the identity of the second application and that the second application uses the first file format;
   receiving, at the exchange infrastructure, a message from the first application;
   generating, at the exchange infrastructure upon determining that the second application uses the first file format, a markup language file envelope comprising content of the message unchanged and a header in the open standard language, the header comprising routing information for the message, the content remaining in the first file format without being converted or mapped to the open standard language; and
   routing the markup language file envelope through the exchange infrastructure via one or more pipeline services for delivery to the second application;
   wherein the open standard language is one of extensible markup language (XML), Simple Object Access Protocol (SOAP), or Web Services Description Language (WSDL).

14. The system of claim 13, wherein the operations further comprise: receiving the message at the exchange infrastructure from the first application, which is implemented on other one or more processors than the exchange infrastructure.

15. The system of claim 13, wherein the operations further comprise:
   determining, at the exchange infrastructure, that a second message received by the exchange infrastructure from a third application that uses a third file format is to be routed between the third application and a fourth application that uses a fourth file format that differs from and is incompatible with the third file format, one or both of the third file format and the fourth file format differing from and being incompatible with the open standard language; and
   converting, at the exchange infrastructure, the second message into a converted second message in the open standard language; and
   routing the converted second message through the exchange infrastructure for delivery to the fourth application.

16. The system of claim 15, wherein the operations further comprise: converting the converted second message from the open standard language to the fourth file format at the exchange infrastructure.

17. The system of claim 13, wherein the first provider comprises an external software component that communicates with the exchange infrastructure over a network and the first file format comprises a proprietary file format, the method further comprising generating a proxy by the exchange infrastructure to implement an interface for the external software component locally within the exchange infrastructure using the open standard language.

* * * * *